Nov. 27, 1956   J. MERCIER   2,771,968
SHOCK ABSORBER
Original Filed Jan. 30, 1948   2 Sheets-Sheet 1

INVENTOR:
JEAN MERCIER

BY
Richardson, David and Nordon
Arry's

Nov. 27, 1956
J. MERCIER
2,771,968
SHOCK ABSORBER
Original Filed Jan. 30, 1948
2 Sheets-Sheet 2
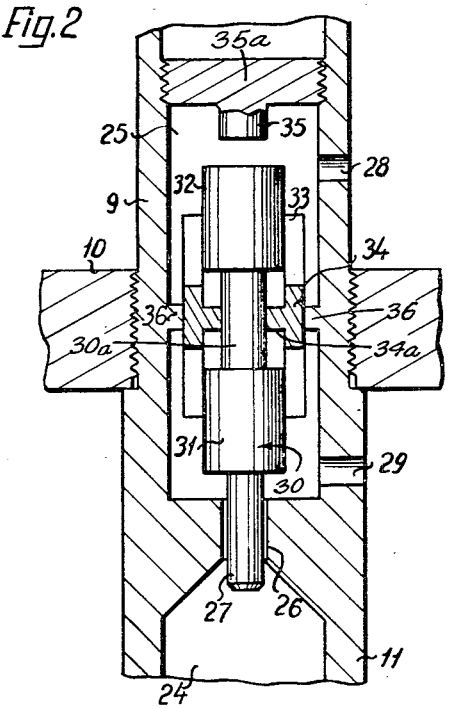
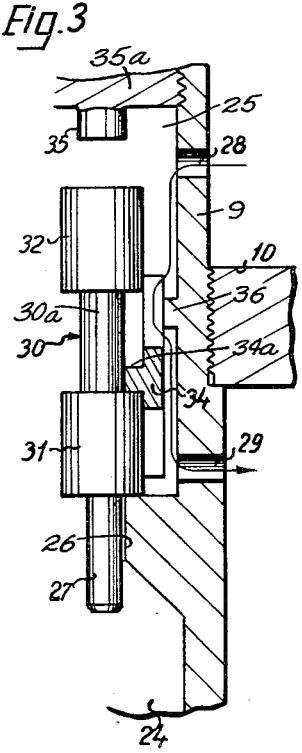
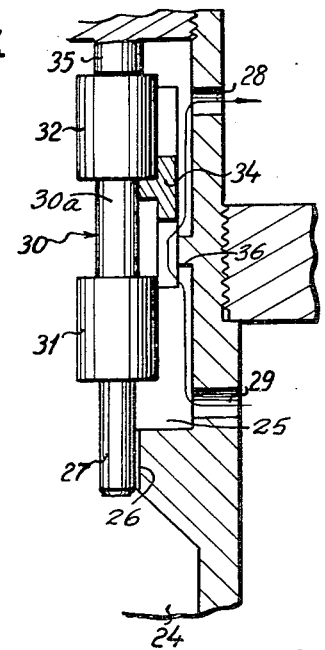
INVENTOR:
JEAN MERCIER
by Richardson, David and Nordon
ATTYS United States Patent Office 2,771,968
Patented Nov. 27, 1956

2,771,968
SHOCK ABSORBER

Jean Mercier, New York, N. Y.

Original application January 30, 1948, Serial No. 5,348. Divided and this application April 5, 1952, Serial No. 280,725

Claims priority, application Luxemburg February 4, 1947

4 Claims. (Cl. 188—96)

The present invention refers to shock absorber devices comprising a fluid pressure cylinder and a damping plunger head or piston slidable therein.

This application is a division of a presently abandoned application, Serial No. 5,348, filed by me and by Pierre Audemar as joint inventors on January 30, 1948.

Usually, the damping plunger head or piston is provided with flow resistance means to afford energy dissipation by restricting passage of fluid through the piston during movement thereof, said flow resistance means comprising a port for permitting fluid to pass from side to side of the damping piston and a valve member cooperating with said port and subjected to the variable fluid pressure on either side of the piston so as to exercise damping control which is different in one direction of piston travel from that which it exercises in the other direction.

One object of the invention is to provide a novel and improved damping control valve assembly in shock absorber devices of the type referred to.

According to the invention, the valve assembly for controlling the fluid flow from side to side of a damping piston comprises a freely movable sleeve valve member and a control element which limits the movement thereof, said valve assembly being subjected to the variable difference between the fluid pressures on opposite sides of the damping piston and said control element being additionally subjected to a substantially constant or comparatively slowly varying fluid pressure in an auxiliary chamber in such a manner that the difference in damping control between the two directions of piston travel depends upon the value of said substantially constant or comparatively slowly varying pressure of the fluid in said auxiliary chamber. A valve assembly of this general type is disclosed in my prior Patent No. 2,031,000.

The invention is intended particularly as an improvement in shock absorbing devices in which a relatively incompressible elastic fluid is compressed in a cylinder by means of a so-called differential plunger assembly constituted by a damping piston connected on opposite sides to two piston rods of different diameters in such a way that the net increase of volume occupied by the larger lower piston rod penetrating upwardly within the cylinder is determined substantially by the difference between the cross-sectional areas of the two rods. The invention is not limited, however, to shock absorbing devices employing said differential displacement volume plunger assembly but may be applied with advantage to damping plunger heads or pistons actuated by a single piston rod only.

It is therefore another object of the invention to provide an improved shock absorber construction comprising a fluid pressure cylinder and a damping piston therein connected to at least one piston rod, there being novel flow resistance means disposed within said rod to afford energy dissipation by passage of fluid therethrough.

Other objects and advantages of the invention will appear from the embodiment thereof, which by way of example, is described in the following specification and illustrated in the accompanying drawings in which:

Figs. 2, 3 and 4 are enlarged detail fragmentary sectional views showing the novel damping control valve assembly of Fig. 1 in three different positions.

Figure 1:
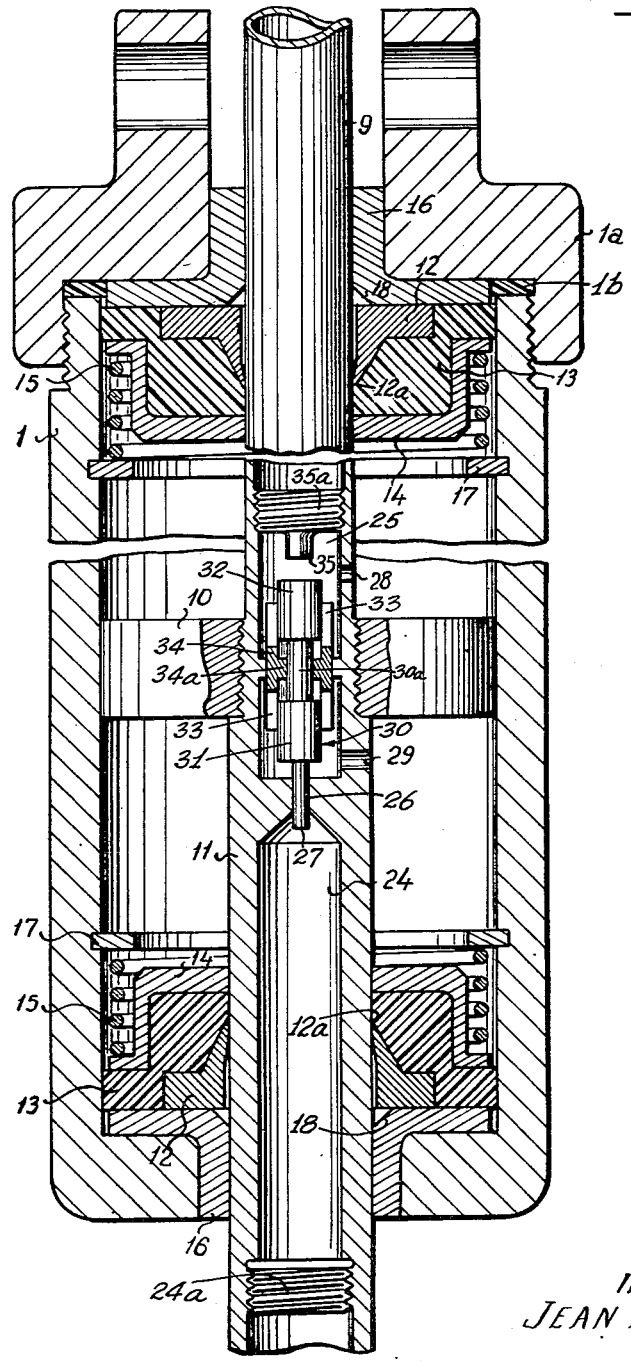
Fig. 1 is an axial section of a shock absorbing device constructed in accordance with the invention.

Referring to the drawings, the shock absorbing device comprises a cylinder 1 axially traversed by a piston rod comprising two parts of different diameters 9 and 11. When this rod moves upwardly, the relatively incompressible elastic fluid filling the cylinder 1 is compressed, the reduction of volume of the fluid being determined for each linear unit of longitudinal displacement of the rod by the difference between the cross-sectional areas of the parts 9 and 11. It is easy to understand that the two portions of the piston rod may be of any diameters required by the mechanical conditions, without thereby determining a compression rate of the fluid which is too high and without necessitating a large volume of fluid to obtain the desired effective resiliency which would otherwise require an unduly large cylinder. Moreover, such an arrangement presents the advantage that the composite piston rod 9, 11 is guided between two fixed bearings 16 located at opposite ends of the cylinder 1, so as to assure an accurate centering of the rod.

Fig. 1 shows a hollow cylinder 1 illustratively arranged with its axis in a vertical position. The upper end of the cylinder 1 is shown closed by a load supporting cap 1a which is threadedly secured to the upper end of cylinder 1. A gasket 16 provides a tight seal. Extending axially through the cylinder 1 and cap 1a is a piston rod comprising an upper portion 9 and a lower portion 11. The central portions of the cylinder 1 and upper piston rod 9 have been omitted to reduce the length of the cylinder as shown in the drawing. The upper portion 9 of the piston rod 9–11 is shown as being of smaller diameter than the lower portion 11. Upward movement of the piston rod 9–11 will thus compress the hydraulic fluid within the cylinder 1 to an extent determined by the difference between the cross-sectional areas of the upper and lower piston rod portions 9 and 11, respectively, and by the extent of such upward movement. The difference between the cross-sectional areas of piston rod portions 9 and 11 is so selected with respect to the compressional modulus of elasticity of the hydraulic fluid and the resiliency of the other portions of the hydraulic system that the desired amount of relative upward movement of piston rod 9—11 into cylinder 1 will be produced by a predetermined downwardly directed static load applied to cap 1a.

The piston rod 9—11 passes through guide bearings 12 located at opposite ends of the cylinder 1. Fluid tight packings are provided inwardly of the guide bearings 12 to prevent the leakage of hydraulic fluid in the course of operation of the shock absorber. Each packing comprises a metallic scraping ring 12 which has an inwardly directed relatively thin annular lip portion 12a which presses against the external cylindrical surface of the piston rod 9—11. Pressure is applied to the scraping ring 12 by an annular body 13 formed of resilient material. The annular resilient body 13 is retained by a flanged cup member 14. A helical compression spring 15 bears against a retaining ring 17 and presses against the flange of the cup member 14 thereby continuously applying pressure to the resilient body 13 and to the scraping ring 12. This spring pressure is augmented by the pressure of the hydraulic fluid within the cylinder 1. The innermost edge of each guide bearing 16 is bevelled at 18 in order that the portion of its surface area which engages the base of the scraping ring 12 alone shall be smaller than the portion of its surface area which is acted upon by the compression spring 15 and the fluid pressure. This preferred form of packing increases its sealing action with increased hydraulic pressure.

A double-acting piston 10 is mounted on the piston rod 9—11 being threadedly secured to the smaller diameter portion 9 adjacent to the inner end of the larger diameter portion 11. The piston 10 divides the cylinder 1 internally into two portions of oppositely variable volumes. The lower and larger piston rod portion 11 is hollow forming an auxiliary chamber 24 which is filled with hydraulic fluid and which is closed at its lower end by a screw plug 24a.

The smaller piston rod portion 9 is also hollow, defining a main chamber 25. The lower auxiliary chamber 24 communicates with the upper main chamber 25 through an aperture which is partially closed by the lower end plunger portion 27 of a control element designated generally as 30, leaving a small annular metering orifice 26 for the flow of fluid between the auxiliary chamber 24 and the damping chamber 25. The metering orifice 26 permits a gradual flow of hydraulic fluid and an accompanying pressure equalization between the main chamber 25 and the auxiliary chamber or reservoir 24 in larger piston rod portion 11. This pressure equalization takes place insofar as static load conditions are concerned, the cylindrical metering orifice or bleed duct 26 being of such small dimensions that fluid flow is effectively prevented with respect to dynamic conditions when the shock absorber is responding to and damping road shocks.

The main chamber 25 communicates with the cylinder space above the piston 10 through an upper orifice 28 formed in the wall of the hollow upper piston rod portion 9. The main chamber 25 also communicates with the space below the piston 10 through a lower orifice 29.

An inwardly extending annular flange 36 is centrally located in the main chamber 25. A hollow cylindrical valve member 34 is freely vertically slidable in main chamber 25 and its external surface engages the annular flange 36. The valve member 34 is provided with upper and lower ports 33 which may be moved past the annular flange 36 to permit fluid flow around the flange 36 and past the valve member 34 between upper and lower damping chamber orifices 28 and 29, respectively.

The control element 30 is provided with enlarged piston portions 31 and 32 interconnected by a central rod portion 30a of reduced diameter which passes freely slidably through a transverse central wall 34a in the hollow cylindrical valve member 34. Vertical movement of valve member 34 is limited by engagement of its transverse wall 34a with one or the other of the inner faces of piston portions 31 or 32 of the control element 30. Upward movement of control element 30 is limited by a downwardly extending projection 35 formed on the lower surface of a screw plug 35a which closes the upper end of main chamber 25. Downward movement of control element 30 is limted by engagement between the lower surface of ts lower piston portion 31 and the bottom of main chamber 25.

In operation, a downwardly directed static load applied to the cylinder cap 1a causes relative upward movement of the larger piston rod portion 11 into the cylinder 1. The extent of this movement is determined by the compressibility of the hydraulic fluid and the resiliency of the hydraulic system, together with the difference between the cross-sectional areas of the upper and lower piston rod portions 9 and 11. The piston 11 assumes a normal position in the cylinder 1 determined by the magnitude of the static load. Hydraulic fluid flows into the auxiliary chamber 24 through the metering orifice 26 and a stable static condition is attained with uniform fluid pressure throughout the shock absorber and with the various parts in the relative normal positions shown in Figs. 1 and 2. The flow rate through metering orifice 26 is sufficiently small so that the pressure in auxiliary chamber 24 remains substantially constant during rapid fluctuations in load force which it is the purpose of the shock absorber to dampen.

Assuming a sudden shock applied to the shock absorber which tends to move the piston 10 upwardly with respect to the cylinder 1, there will be a slight upward displacement at piston 10 accompanied by a sudden increase in fluid pressure in the cylinder space above the piston 10 and a corresponding decrease in pressure below the piston 10. This suddenly produced pressure differential acting on opposite sides of the piston 10 will be communicated to the valve member 34 through the orifices 28 and 29 in the wall of the piston rod 9, sharply urging the valve member 34 downwardly toward the position shown in Fig. 3.

This peak of pressure differential acting on the piston portions 31 and 32, control element 30 will also urge its lower end plunger portion 27 downwardly through metering orifice 26 toward the position shown in Fig. 3 against the yielding resilient action of the relatively incompressible hydraulic fluid in the auxiliary chamber 24. The stiffness of this resilient action is determined by the cross-sectional area of the lower plunger portion 27 of control element 30 and the volume of fluid in auxiliary chamber 24 as well as the compressional modulus of elasticity of the fluid and the stiffness of the walls of the auxiliary chamber 24. With the parts in the relative positions shown in Fig. 3, there is free downward passage through ports 33 of valve member 34 and past annular flange 36 from the upper orifice 28 to the lower orifice 29. This permits fluid to flow from the space above piston 10 to the space below the piston accompanied by an upward movement of the piston 10.

After the shock has subsided and the accompanying pressure differential has terminated, the hydraulic resiliency of the system, described above, will tend to restore the piston 10 to its normal position determined by the magnitude of the static load, thereby urging the piston 10 downwardly toward its normal position. At the same time, the normal average fluid pressure within the auxiliary chamber 24 urges the lower end plunger portion 27 of control element 30 upwardly toward its normal position as shown in Figs. 1 and 2. This is accompanied by an upward displacement of valve member 34. This upward displacement of valve member 34 is limited, however, by the control element 30, the plunger end 27 of which is subjected to the relatively constant normal average or static fluid pressure within the auxiliary chamber 24. As a result, the control element 30 tends to assume its normal position shown in Fig. 1. This prevents upward displacement of valve member 34 to an extent sufficient to move its ports 33 past the annular flange 36 and downward movement of the piston 10 toward its normal position is accordingly retarded and damped.

Similarly, a shock tending to move piston 10 downwardly moves the parts to the relative positions shown in Fig. 4 during the sudden pressure differential accompanying the shock. After the shock has subsided, the control element 30 is urged upwardly toward its normal position and the return movement of piston 10 to its normal position is again retarded and damped by limited movement of valve member 34 as described above.

It is desirable that the return stroke of the piston 10 to its normal position take place under constant and controlled conditions with a reaction force equal to the magnitude of the static load. To obtain this result, certain cross-sectional area ratios should be maintained:
Let:

$a$ represent the cross-sectional area of the lower end 27 of control element 30 which is acted upon by the relatively constant pressure in the auxiliary chamber 24 and which tends to restore control element 30 to its normal position.

$b$ represent the total transverse cross-sectional area of the valve member 34 and the piston portions 31 or 32 of the control plunger 30 which is acted upon by the pressure differential between opposite sides of piston 10 and which tends to displace control plunger 30 from its normal position. This is the same as the circular area defined by the annular flange 36.

R represent the magnitude of the static load carried by the shock absorber.

$s$ represent the difference between the cross-sectional area of the lower piston portion 11 and the upper piston portion 9 which is the net effective area acted upon by the load R under static conditions.

S represent the effective area of the upper surface of piston 10.

$P_0$ represent the static pressure produced by the load R such that $$P_0 s = R$$

$P_1$ represent the downward pressure acting on the upper surface of piston 10 of effective area S.

$P_2$ represent the upward pressure acting on the lower surface of piston 10 of effective area $(S-s)$.

Then, the forces acting on the upper side of piston 10 must be equal to the forces acting on the lower side of piston 10, or $$P_1 S = R + P_2(S-s)$$

Substituting to eliminate R:

$$P_1 S = P_0 s + P_2(S-s)$$

But under static conditions $P_1 = P_2 = P_0$.

Therefore the corresponding valve areas should be proportional to S, $s$ and $(S-s)$. These valve areas are respectively $a$, $b$ and $(a-b)$.

The following area ratios should therefore be maintained:

$$\frac{a}{s} = \frac{b}{S} = \frac{a-b}{S-s}$$

What I claim is:

1. A shock absorbing device comprising a cylinder containing a fluid and a piston reciprocable in said cylinder to subject said fluid on both of its sides to variations in pressure, said piston being provided with a rod, two chambers formed within said rod, the first of which contains fluid at substantially constant pressure and the second of which communicates with the cylinder spaces on both sides of said piston so as to provide a passage permitting fluid flow from side to side of the piston during movement thereof, a valve assembly including a valve member and a control element therefor both capable of relative movement in relation to each other and arranged within said second chamber so as to be subjected to the variable fluid pressures in both said cylinder spaces, and means to additionally subject said control element on one side to said substantially constant fluid pressure in such a manner that said valve member is allowed to open said passage under the action of either one of said variable fluid pressures only when said control element has been displaced by the same fluid pressure either against said substantially constant fluid pressure or through the intermediary thereof.

2. A shock absorbing device comprising a cylinder containing a fluid and a piston reciprocable in said cylinder to subject said fluid on both of its sides to variations in pressure, said piston being provided with a hollow rod, a transverse wall in said piston rod, provided with a port to form two intercommunicating coaxial chambers the inner of which has openings for establishing a communication between the cylinder spaces on both sides of said piston through said inner chamber, and a sliding valve assembly for controlling said communication positioned within said inner chamber so as to be subjected to the variable fluid pressures in said cylinder spaces, said valve assembly comprising a valve member, a control element therefor adapted to limit the movements of the valve member in both directions, and flow resistance means connected to said control element and cooperating with said port to maintain a substantially constant fluid pressure within the outer of said two chambers and to thereby subject said control element to said substantially constant fluid pressure so that said valve member will permit communication between said cylinder spaces under the action of either one of said variable fluid pressures only when said control element is displaced by the same fluid pressure either against said substantially constant fluid pressure or through the intermediary thereof.

3. A shock absorbing device according to claim 2, in which said hollow piston rod comprises two portions of different external diameters extending outwardly from said piston beyond opposite ends of said cylinder.

4. In a shock absorber comprising a cylinder containing a fluid and a damping piston reciprocable in said cylinder to subject said fluid on both of its sides to variations in pressure, said piston being provided with at least one rod, a main chamber formed within said rod and having openings to provide a passage permitting fluid flow from side to side of said damping piston during movement thereof, an auxiliary chamber formed within said rod and communicating with said main chamber through a port, an annular flange on the inner wall of said rod projecting within said main chamber, sliding valve means for controlling said passage positioned within said main chamber so as to be subjected to the variable fluid pressures at both sides of said damping piston, said valve means including a double piston consisting of two spaced piston portions interconnected by a rod, a piston-like extension on one of the outer working faces of said double piston adapted to engage said port with an annular clearance so as to constitute a flow resistance means between said main and auxiliary chambers responsive to the substantially constant fluid pressure which it maintains within said auxiliary chamber, a sleeve-like valve member having an inwardly projecting flange slidably mounted on said rod of said double piston so as to be movable between two inner working faces of said two piston portions under differential action of said variable fluid pressures, said flange of the sleeve-like valve member cooperating with said annular flange of the damping piston rod to normally close said passage but to open the same as soon as said double piston is displaced under the action of the same variable fluid pressure which acts upon said valve member either against said substantially constant fluid pressure or through the intermediary thereof, and abutment means provided within said damping piston rod to limit the movement of said double piston in a direction opposite to that in which said piston-like extension engages said port.

References Cited in the file of this patent
UNITED STATES PATENTS

| | | |
|---|---|---|
| 846,943 | Phipps | Mar. 12, 1907 |
| 1,072,350 | Muller | Sept. 2, 1913 |
| 1,150,925 | Benner | Aug. 24, 1915 |
| 2,047,722 | Work | July 14, 1936 |
| 2,161,811 | Grebe | June 13, 1939 |
| 2,346,667 | Dowty | Apr. 18, 1944 |
| 2,537,491 | Thornhill | Jan. 9, 1951 |